United States Patent [19]

Schmitt

[11] Patent Number: 5,714,133
[45] Date of Patent: Feb. 3, 1998

[54] CRYSTALLINE ALUMINOSILICATE ZEOLITE SYNTHESES

[75] Inventor: Kirk D. Schmitt, Dallas, Tex.

[73] Assignee: Mobil Oil Corporation, Fairfax, Va.

[21] Appl. No.: 548,125

[22] Filed: Oct. 25, 1995

Related U.S. Application Data

[63] Continuation-in-part of Ser. No. 258,874, Jun. 13, 1994, abandoned.

[51] Int. Cl.[6] .......................... C01B 39/20; C01B 39/26; B01J 29/08
[52] U.S. Cl. .................. 423/710; 423/328.2; 423/711; 423/718; 502/64; 502/70; 502/71; 502/77; 502/78; 502/79
[58] Field of Search .................. 502/64, 70, 71, 502/77, 78, 79; 423/710, 711, 718, 328.2

[56] References Cited

U.S. PATENT DOCUMENTS

| | | | |
|---|---|---|---|
| 2,950,952 | 8/1960 | Breck et al. | 23/113 |
| 3,692,470 | 9/1972 | Ciric | 423/328 |
| 3,920,798 | 11/1975 | Weber | 423/329 |
| 3,972,983 | 8/1976 | Ciric | 423/328 |
| 4,374,093 | 2/1983 | Rollmann et al. | 422/202 |
| 4,581,341 | 4/1986 | Himpsl | 502/68 |
| 4,778,666 | 10/1988 | Chu et al. | 423/326 |
| 5,133,953 | 7/1992 | Vaughan et al. | 423/328 |

OTHER PUBLICATIONS

Eddy J.P. Feijen, Johan A. Martens and Pierre A. Jacobs, "Zeolites and their Mechanism of Synthesis", 1994 Elsevier Science B.V., vol. 84, Studies in Surface Science and Catalysis, pp. 3–21.

Sylvie Gonthier and Robert W. Thompson, "Effects of Seeding on Zeolite Crystallisation, and the Growth Behavior of Seeds", 1994 Elsevier Science B.V., vol. 85, Studies in Surface Science and Catalysis, pp. 43–73.

Gunter H. Kuhl, "Crystallization of Low–silica Faujasite ($SiO_2/Al_2O_3\sim2.0$)", 1987 Butterworth & Co. (Publishers) Ltd., vol. 7, Sep. 1987, pp. 451–457.

D.M. Ginter, A.T. Bell and C.J. Radke, "The Effects of Gel Aging on the Synthesis of NaY Zeolite from Colloidal Silica", 1992 Butterworth–Heinemann, vol. 12, Jul./Aug. 1992, pp. 742–749.

D.M. Ginter, G.T. Went, A.T. Bell and C.J. Radke, "A Physicochemical Study of the Aging of Colloidal Silica Gels Used in Zeolite Y Synthesis", Center for Advanced Materials, Lawrence Berkeley Laboratory and Department of Chemical Engineering, University of CA, Berkeley, CA., 3 Jan. 1992, pp. 733–740.

L.B. Sand, "Molecular Sieves", Society of Chemical Industry 1968, pp. 71–84.

*Primary Examiner*—Glenn Caldarola
*Assistant Examiner*—Bekir L. Yildirim
*Attorney, Agent, or Firm*—Lori F. Cuomo; Dennis P. Santini

[57] ABSTRACT

The invention relates to an improvement in the method for synthesis of crystalline aluminosilicate zeolites, such as ZSM-10, whose synthesis requires or is improved by one or more periods of gel aging. The gel aging step is replaced by a continuous increase in temperature to the final crystallization temperature.

6 Claims, No Drawings

CRYSTALLINE ALUMINOSILICATE ZEOLITE SYNTHESES

CROSS REFERENCE TO RELATED APPLICATIONS

This application is a continuation-in part of U.S. application Ser. No. 08/258,874, filed Jun. 13, 1994, now abandoned, incorporated herein in its entirety by reference.

FIELD OF THE INVENTION

The invention relates to a method for the synthesis of crystalline aluminosilicate zeolites whose synthesis requires or is improved by one or more periods of aging at temperatures less than the final crystallization temperature.

BACKGROUND OF THE INVENTION

Crystalline catalysts such as zeolites are usually crystallized by mixing synthesis gels at or below room temperature and then heating the gel at elevated temperature to effect crystallization. For most zeolites the time between the end of mixing and the beginning of the crystallization at elevated temperature is not important and it is economically advantageous, i.e. increases reactor through put, to heat the gel to the final temperature very quickly. Sometimes rapid heat up is critical and microwave heating is used to get to the final temperature as fast as possible, as described in U.S. Pat. No. 4,778,666. For some zeolites, the heat up time may be reduced effectively to zero by continuous crystallization in a flow reactor, as described in U.S. Pat. No. 4,374,093.

The synthesis of many zeolites, on the other hand, requires or is improved by one or more periods of aging for times greater than 0.4 days. An example of an intermediate aging temperature is 40° C., Kuehl, G. Zeolites 1987, p.7, 451.

U.S. Pat. No. 3,692,470 to Ciric called for aging 3 days at room temperature then heating 10 days at 100° C. for synthesis of ZSM-10. Hironaka et al. (Japanese Kokai Patent No. HEI 2[1990]-258617, 1990) changed this slightly by aging 3 days at room temperature, heating 7 days at 100° C., then two days at 140° C.

Therefore, it is an object of the present invention to provide a shorter process for the reproducible, scaleable synthesis of crystalline aluminosilicate zeolites.

It is a further object of the present invention to provide a shorter process for the reproducible, scaleable synthesis of ZSM-10.

SUMMARY OF THE INVENTION

The method of the present invention is not limited to synthesis of a single zeolite but can be used to produce a wide range of zeolites which require or are improved by one or more periods of aging, for example Zeolite X, mordenite, Zeolite T, Zeolite Y, ZSM-10 and ZSM-20.

The invention relates to a method for the synthesis of a crystalline aluminosilicate zeolite comprising gel aging at fixed temperatures, the improvement comprising a continuous increase in temperature in which the temperature is raised at an average rate defined by:

$$\frac{(\text{final temperature} - \text{initial temperature})(\text{savings factor})}{\text{time}}$$

wherein the final temperature is equal to the upper temperature at which the gel will be held after aging;

wherein the initial temperature is equal to the lesser of either temperature at which gel is aged or temperature at which gel is mixed;

wherein the time is equal to sum of individual aging times at fixed temperatures and wherein the time is greater than 0.4 days.

DETAILED DESCRIPTION OF THE INVENTION

In the method of the present invention one or more periods of aging of the synthesis gel are replaced by a continuous increase in temperature in which the temperature is raised at an average rate. The method of the present invention is readily and reproducibly scaled.

The role of aging some amorphous gel solutions appears to provide a time during which the solution can form nuclei, which can then become activated at elevated temperatures. These steps are sometimes necessary for successful crystallization.

In the method of the present invention, the average rate is defined by:

$$\frac{(\text{final temperature} - \text{initial temperature})(\text{savings factor})}{\text{time}}$$

wherein the "final temperature" is the upper temperature at which the gel will be held after aging;

wherein the "initial temperature" is the lower of either the temperature at which the gel is aged or the temperature at which the gel is mixed;

wherein the "time" is the sum of the individual aging times at fixed temperatures of less than about 40° C. and "time" is greater than 0.4 days; and wherein the "savings factor" varies from 1.1 to 10.

The instantaneous rate (fluctuation in heat up rate) may be no more than three times nor less than one third the average rate for any period exceeding 1% of time/savings factor.

Time and temperature units are not critical as long as the units are consistent. The smaller the savings factor, the less savings in terms of time. To save more in terms of time, a savings factor of 10 should be used.

Crystalline aluminosilicate zeolites which may be synthesized include Zeolite X, mordenite, Zeolite T, Zeolite Y, ZSM-10 and ZSM-20.

ZSM-10 and its conventional preparation is taught by U.S. Pat. No. 3,692,470, the entire disclosure of which is incorporated by reference. It has a distinctive X-ray diffraction pattern which identifies it from other known crystalline materials. Conventional crystallization of ZSM-10 generally requires a long reaction period for the formation of the desired crystalline zeolite product. ZSM-10 formation is dependent on nucleation which is slow at room temperature and does not occur at high temperatures.

ZSM-20 and its conventional preparation is disclosed in U.S. Pat. No. 3,972,983.

Zeolite Y and its conventional preparation is disclosed in U.S. Pat. No. 3,310,007.

Zeolite X and its conventional preparation is disclosed in U.S. Pat. No. 2,882,244.

Zeolite T and its conventional preparation is disclosed in U.S. Pat. No. 2,950,952.

Mordenite and its conventional preparation is disclosed in L. B. Sand, Molecular Sieves, Soc. of Chem. Industry, london, p.71 (1968).

For illustration purposes, the crystallization method herein will be more fully described in connection with the preparation of ZSM-10. In making ZSM-10 in accordance with U.S. Pat. No. 3,692,470, Ciric called for aging 3 days at room temperature then heating 10 days at 100° C. to form ZSM-10. In Japanese Kokai Patent No. HEI 2[1990]-258617, 1990, Hironaka et al. changed the preparation of the ZSM-10 disclosed in U.S. Pat. No. 3,692,470 slightly by aging 3 days at room temperature, heating 7 days at 100° C., then two days at 140° C.

It has now been found that nucleation can be speeded by slowly raising the temperature to the crystallization temperature.

Using the above average rate calculation with a savings factor of 1.5 and the Ciric aging step of 3 days at room temperature and the final temperature of Japanese Kokai Patent No. HEI 2[1990]-258617 of 140° C.:

$$\frac{(140° C. -25° C.)(1.5)}{3 \text{ days}} = 57.5° \text{ C./day} = \text{rate. And}$$

$$\frac{115° \text{ C. at}}{57.5° \text{ C./day}} = 2 \text{ days}$$

Linearly ramping the crystallization temperature from room temperature to 140° C. over 2 days (average rate 57.5° C./day) and then maintaining the temperature at 140° C. a further 2 days results in ZSM-10, shortening the aging process of Ciric. Surprisingly, the total crystallization time was also reduced.

The crystalline aluminosilicate zeolite may be composited with conventional binders such as silica, alumina, zirconia, and silica-alumina. Naturally occurring clays which can be composited include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, the present composition can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite.

The following examples illustrate the process of the present invention.

EXAMPLE 1

ZSM-10 is synthesized by adding 10.8 grams Al powder in portions over about 20 minutes to a solution of 39.6 grams KOH in 308 ml. H₂O in an ice cooled, magnetically stirred jar. After stirring 3.5 hours, 217 ml. 1.56N diquat-1 solution having the structure

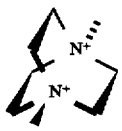

and 143 ml. H₂O are added. 10.8 grams Cabosil are added to a solution of 79.6 grams KOH in 968 ml. H₂O and the mixture is stirred magnetically for 3.5 hours. The two solutions are mixed and charged to a 1 gallon autoclave and stirred at about 100 RPM. The temperature is ramped linearly to 140° C. over 2 days then held a further two days at 140° C. After cooling the mixture is centrifuged and washed twice with 1200 ml. H₂O and dried overnight at 85° C. to yield 101 grams white powder containing some brown resin. The material is calcined in 20 gram batches in a tube furnace ramping 3° C./min. to 500° C. under N₂, holding 3 hours, cooling to 250° C., switching to air, ramping 2° C./min. to 500° C., holding 6 hours and cooling. NH₄ exchange is carried out with 20 ml. 1M NH₄Cl/gram calcined zeolite. Three sequential exchanges with intermediate centrifuging are carried out followed by calcination for 3 hours at 500° C. under flowing air. The resulting material has a Si/Al of 7, an Alpha Value of about 100 and hexane sorption of 9.8% (at 25° C. and 30 Torr).

The material is barium exchanged using Ba(NO₃)₂ for 80 hours at 80° C., pH=10, then calcined in air at 540° C. for 8 hours. The Ba exchange and air calcination is repeated. The calcined product is impregnated with (Pt(NH₃)₄)Cl₂ by incipient wetness, dried at 65° C., then calcined again at 260° C. for 2 hours.

EXAMPLE 2

ZSM-10 is synthesized by adding 10.8 grams Al powder in portions over about 20 minutes to a solution of 39.6 grams KOH in 308 ml. H₂O in an ice cooled, magnetically stirred jar. After stirring 3.5 hours, 217 ml. 1.56N diquat-1 solution having the structure

and 143 ml. H₂O are added. 10.8 grams Cabosil are added to a solution of 79.6 grams KOH in 968 ml. H₂O and the mixture is stirred magnetically for 3.5 hours. The two solutions are mixed and charged to a 1 gallon autoclave and stirred at about 100 RPM. The temperature is ramped linearly to 140° C. over 2 days then held a further two days at 140° C. After cooling the mixture is centrifuged and washed twice with 1200 ml. H₂O and dried overnight at 85° C. to yield 101 grams white powder containing some brown resin. The material is calcined in 20 gram batches in a tube furnace ramping 3° C./min. to 500° C. under N₂, holding 3 hours, cooling to 250° C., switching to air, ramping 2° C./min. to 500° C., holding 6 hours and cooling. Five grams of the calcined material are treated with a 50 cc. solution of 110 grams of Pt(NH₃)₄Cl₂. KHCO₃ is added to raise the pH to about 8. The solution is stirred overnight. Solid is filtered, washed and dried in a vacuum oven at 50° C. The dried solid is calcined under flowing air (100 cc/min) to 350° C. at 0.5° C./minute and held at 350° C. for an additional hour. The resulting material contains 0.89 wt. % Pt, 27.70 wt. % Si, 8.99 wt. % Al and 13.64 wt. % K. The Si/Al molar ratio based on analysis is 2.97. The K/Si molar ratio is 1.05.

Changes and modifications in the specifically described embodiments can be carried out without departing from the scope of the invention which is intended to be limited only by the scope of the appended claims.

We claim:

1. In a method for the synthesis of a crystalline aluminosilicate zeolite comprising a gel aging step at a gel aging temperature and a crystallization step at a crystallization temperature, wherein the improvement comprises replacing at least part of the gel aging step with a step of linearly raising the temperature from the gel aging temperature to the crystallization temperature at an average rate defined by $$\frac{(\text{final temperature} - \text{initial temperature})(\text{savings factor})}{\text{time}}$$

wherein the final temperature is equal to upper temperature at which the gel will be held after aging;

wherein the initial temperature is equal to lesser of either temperature at which gel is aged or temperature at which gel is mixed;

wherein the time is equal to sum of individual aging times at fixed temperatures and wherein time is greater than 0.4 days; and wherein savings factor is in the range of from about 1.1 to about 10.

2. The method of claim 1, wherein said crystalline aluminosilicate zeolite is selected from the group consisting of ZSM-10, ZSM-20, mordenite, zeolite Y, zeolite T and zeolite X.

3. The method of claim 2, wherein said crystalline aluminosilicate zeolite is ZSM-10.

4. The method of claim 1, wherein said fixed temperatures are less than about 40° C.

5. A method for the synthesis of ZSM-10, wherein said ZSM-10 is synthesized at a crystallization temperature linearly ramped over about two days to a temperature of about 140° C. and held a further two days at a temperature of about 140° C.

6. A method for the synthesis of a crystalline aluminosilicate zeolite, wherein said crystalline aluminosilicate zeolite is synthesized at a crystallization temperature linearly ramped from gel mixture temperature to the crystallization temperature.

* * * * *